United States Patent
Nguyen (12) 
(10) Patent No.: US 9,342,077 B2
(45) Date of Patent: May 17, 2016

(54) SYSTEM, METHOD AND APPARATUS FOR PLUMBING FITTING WITH REMOVABLE SAMPLING VALVE

(71) Applicant: Hy B. Nguyen, Upland, CA (US)

(72) Inventor: Hy B. Nguyen, Upland, CA (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 147 days.

(21) Appl. No.: 13/668,299

(22) Filed: Nov. 4, 2012

(65) Prior Publication Data

US 2013/0118623 A1 May 16, 2013

Related U.S. Application Data (60) Provisional application No. 61/555,915, filed on Nov. 4, 2011.

(51) Int. Cl.
*F16K 51/00* (2006.01)
*F16L 19/06* (2006.01)
(Continued)

(52) U.S. Cl.
CPC .............. *G05D 7/03* (2013.01); *F16K 27/0281* (2013.01); *F16L 41/008* (2013.01); *F16L 41/14* (2013.01); *F16L 47/04* (2013.01); *Y10T 137/877* (2015.04)

(58) Field of Classification Search
CPC ........... G01N 1/2035; G01N 2001/205; B29C 66/5221; E03C 1/023; F15B 13/0892; F16K 1/308; F16L 41/14; F16L 47/04; F17D 3/10
USPC ................. 137/881, 884; 285/247, 354, 386; 73/863.86; 251/318, 320, 324
See application file for complete search history.

(56) References Cited

U.S. PATENT DOCUMENTS 1,944,191 A * 1/1934 Newmark et al. ................ 184/36
3,408,098 A * 10/1968 Wilson ........................... 285/247
(Continued)

FOREIGN PATENT DOCUMENTS

CN 2320849 Y 5/1999
DE 197 37 353 A1 3/1999
(Continued)

OTHER PUBLICATIONS

Parker Hannifin Corporation, Tube Fitting Division, Catalog 4400 "Triple-Lok (R) Flared Tube Adapters" p. E72, retrieved from https://www.globalfluid.com/p4400_pdf/e72.pdf Dec. 16, 2014, pdf date Jun. 22, 2000.*

(Continued)

*Primary Examiner* — John K Fristoe, Jr.
*Assistant Examiner* — Seth W Mackay-Smith
(74) *Attorney, Agent, or Firm* — Chi Suk Kim; Abel Law Group, LLP (57) ABSTRACT

A plumbing assembly includes a plumbing fitting having a body. The body includes a main body portion having a main bore extending there through. A peripheral body portion extends from the main body portion. The peripheral body portion includes a distal end and a sampling bore extends through the peripheral body such that the sampling bore is in fluid communication with the main bore. The plumbing assembly further includes a sampling valve threadably coupled to the distal end of the peripheral body portion of the plumbing fitting. The sampling valve extends at least partially into the sampling bore without extending into the main bore. As such, the main bore is unimpeded by the sampling valve and use of the sampling valve imparts substantially no pressure drop in a fluid passing through the main bore of the plumbing fitting.

20 Claims, 9 Drawing Sheets

(51) Int. Cl.
*F16L 25/00* (2006.01)
*F16L 47/06* (2006.01)
*G01N 1/20* (2006.01)
*G05D 7/03* (2006.01)
*F16K 27/02* (2006.01)
*F16L 41/00* (2006.01)
*F16L 41/14* (2006.01)
*F16L 47/04* (2006.01)

(56) References Cited

U.S. PATENT DOCUMENTS

| | | | | |
|---|---|---|---|---|
| 3,542,332 | A * | 11/1970 | Chevalier et al. | 251/63.6 |
| 4,174,632 | A * | 11/1979 | Jansen | 73/863.86 |
| 4,472,977 | A * | 9/1984 | Lynn | 73/863.83 |
| 4,484,482 | A | 11/1984 | Fournier et al. | |
| 4,549,440 | A | 10/1985 | Fournier et al. | |
| 4,872,638 | A | 10/1989 | Thompson et al. | |
| 4,995,589 | A * | 2/1991 | Adishian et al. | 251/335.3 |
| 5,005,432 | A * | 4/1991 | Faulkner | 73/863.86 |
| 5,095,765 | A | 3/1992 | Filbey et al. | |
| 5,213,375 | A * | 5/1993 | Wu | 285/38 |
| 5,246,204 | A | 9/1993 | Ottung | |
| 5,277,226 | A * | 1/1994 | Kuhlman | 137/862 |
| 5,316,349 | A * | 5/1994 | Rafeld | 285/133.3 |
| 5,634,627 | A * | 6/1997 | Daido et al. | 251/335.3 |
| 5,893,273 | A * | 4/1999 | Casiraghi | 62/511 |
| 5,992,904 | A * | 11/1999 | Hitachi et al. | 285/332 |
| 6,022,053 | A * | 2/2000 | Hukuda | 285/331 |
| 6,213,149 | B1 | 4/2001 | Moner | |
| 6,305,665 | B1 * | 10/2001 | Coura et al. | 251/335.3 |
| 6,345,397 | B1 * | 2/2002 | Haubrich | 4/615 |
| 6,345,642 | B1 * | 2/2002 | Yoshidome et al. | 137/240 |
| 6,719,002 | B2 | 4/2004 | Shaw | 137/315.01 |
| 6,905,142 | B2 * | 6/2005 | Do et al. | 285/89 |
| 6,966,328 | B2 | 11/2005 | Benham | |
| 7,963,297 | B2 * | 6/2011 | Huang et al. | 137/231 |
| 7,971,909 | B2 | 7/2011 | Nakata et al. | |
| 2005/0016620 | A1 | 1/2005 | Proulx et al. | |
| 2005/0150546 | A1 | 7/2005 | Liepold et al. | |
| 2006/0060812 | A1 | 3/2006 | Hoobyar et al. | |
| 2006/0142730 | A1 | 6/2006 | Proulx et al. | |
| 2007/0106264 | A1 | 5/2007 | Proulx et al. | |
| 2007/0267869 | A1 * | 11/2007 | Patel | 285/386 |
| 2010/0090456 | A1 * | 4/2010 | Halaczkiewicz et al. | 285/12 |
| 2011/0127771 | A1 * | 6/2011 | Panusa | 285/354 |
| 2011/0197989 | A1 | 8/2011 | Proulx et al. | |
| 2014/0210205 | A1 * | 7/2014 | Yamada et al. | 285/386 |

FOREIGN PATENT DOCUMENTS

| | | |
|---|---|---|
| EP | 1 090 877 A1 | 4/2001 |
| EP | 2187106 A | 5/2010 |
| GB | 2 455 444 A | 6/2009 |
| JP | H0735875 U | 7/1995 |
| JP | H10-185063 A | 7/1998 |
| JP | 2000257784 A | 9/2000 |
| JP | 2002-228071 A | 8/2002 |
| JP | 2003-502607 A | 1/2003 |
| JP | 2007-120741 A | 5/2007 |
| JP | 2009052572 A | 3/2009 |
| JP | 2010180907 A | 8/2010 |
| KR | 20-2007-0000553 U | 5/2007 |
| WO | 2013/067471 A1 | 5/2015 |

OTHER PUBLICATIONS

International Search Report for PCT/US2012/063479 dated Mar. 20, 2013, 3 pgs.
Extended European Search Report for PCT Application No. PCT/US2012/063479 dated Jul. 16, 2015.

* cited by examiner

SECTION 9-9

SYSTEM, METHOD AND APPARATUS FOR PLUMBING FITTING WITH REMOVABLE SAMPLING VALVE

CROSS-REFERENCE TO RELATED APPLICATION

The present application claims priority from U.S. Provisional Patent Application No. 61/555,915 entitled "System, Method and Apparatus For Plumbing Fitting with Removable Sampling Valve," by Hy B. Nguyen filed Nov. 4, 2011, which is incorporated by reference herein in its entirety.

FIELD OF THE DISCLOSURE

The invention generally relates to valves and, in particular, to a system, method and apparatus for a plumbing fitting with a removable and replaceable sampling valve.

DESCRIPTION OF RELATED ART

Sampling valves are commonly used in fluid plumbing systems to provide samples of the fluid flowing within the system without disrupting the fluid flow. Conventional sampling valves typically comprise units that have completely integrated and permanently mounted components. Such sampling valves are permanently installed in the plumbing. When any component on a sampling valve unit fails, the entire sampling valve must be replaced. Replacing such a sampling valve requires all conduits connected to the sampling valve to be cut and reattached to a new unit. This replacement process requires a significant interruption in fluid flow, which adds to the cost of replacement.

Thus, improved systems, methods and devices for replacing sampling valves continue to be of interest.

BRIEF DESCRIPTION OF THE DRAWINGS

So that the manner in which the features and advantages of the embodiments are attained and can be understood in more detail, a more particular description briefly summarized above may be had by reference to the embodiments thereof that are illustrated in the appended drawings. However, the drawings illustrate only some embodiments and therefore are not to be considered limiting of its scope as the invention may admit to other equally effective embodiments.

The use of the same reference symbols in different drawings indicates similar or identical items.

DETAILED DESCRIPTION

Referring to FIG. 1 through FIG. 5, a first embodiment of a plumbing assembly with a replaceable sampling valve is shown and is generally designated 20. The plumbing assembly 20 can include a plumbing fitting 21 and a sampling valve assembly 41. As indicated, the plumbing fitting 21 can be generally T-shaped and can include a body 22 having a generally cylindrical main body portion 23 and a generally cylindrical peripheral body portion 24 extending from the main body portion 23 at an angle. In a particular aspect, the peripheral body portion 24 can extend perpendicularly from the main body portion 23.

Figure 5:
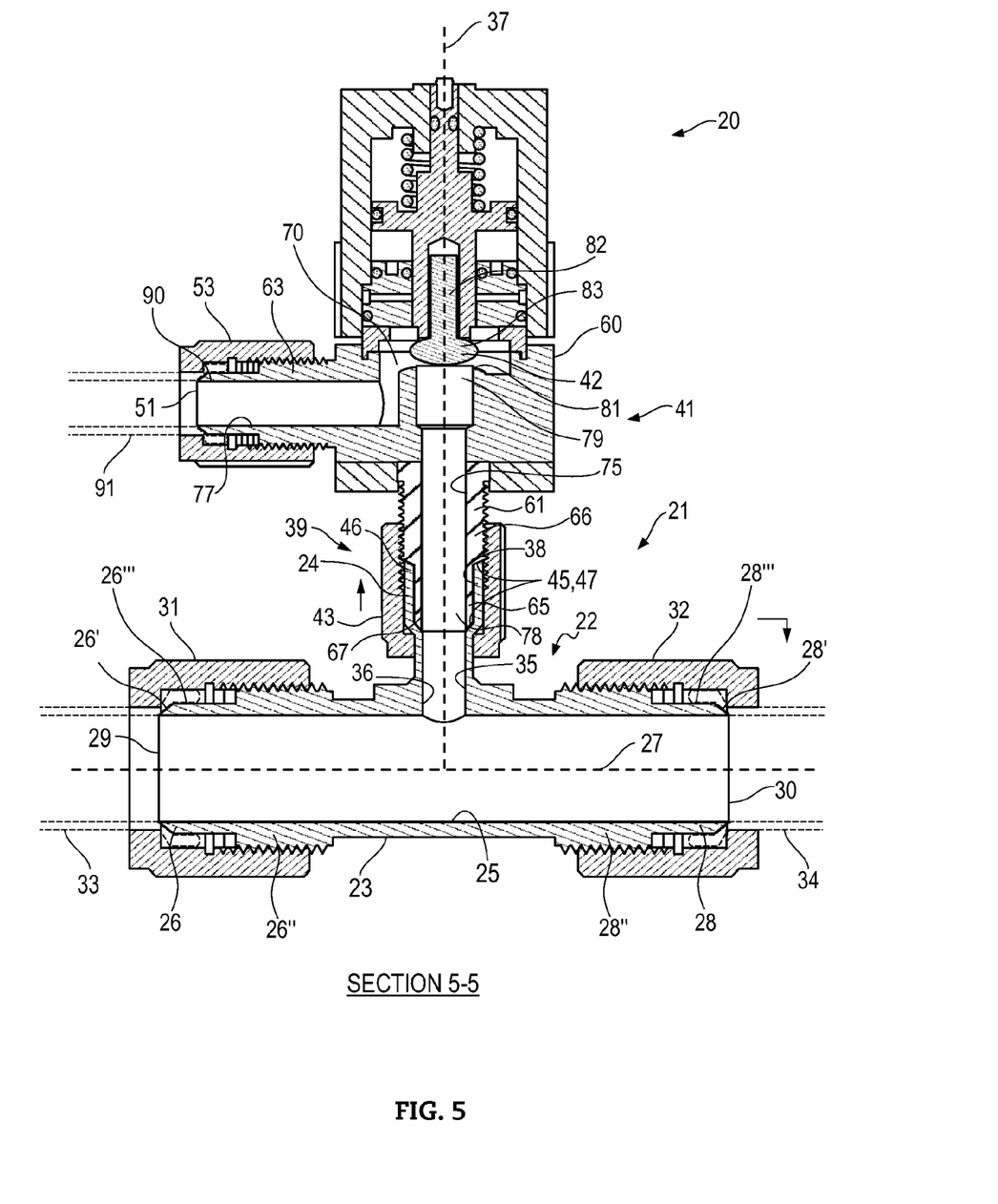
FIG. 5 includes a cross-sectional view of a plumbing assembly in accordance with a particular embodiment taken along line 5-5 in FIG. 4.
Figure 6:
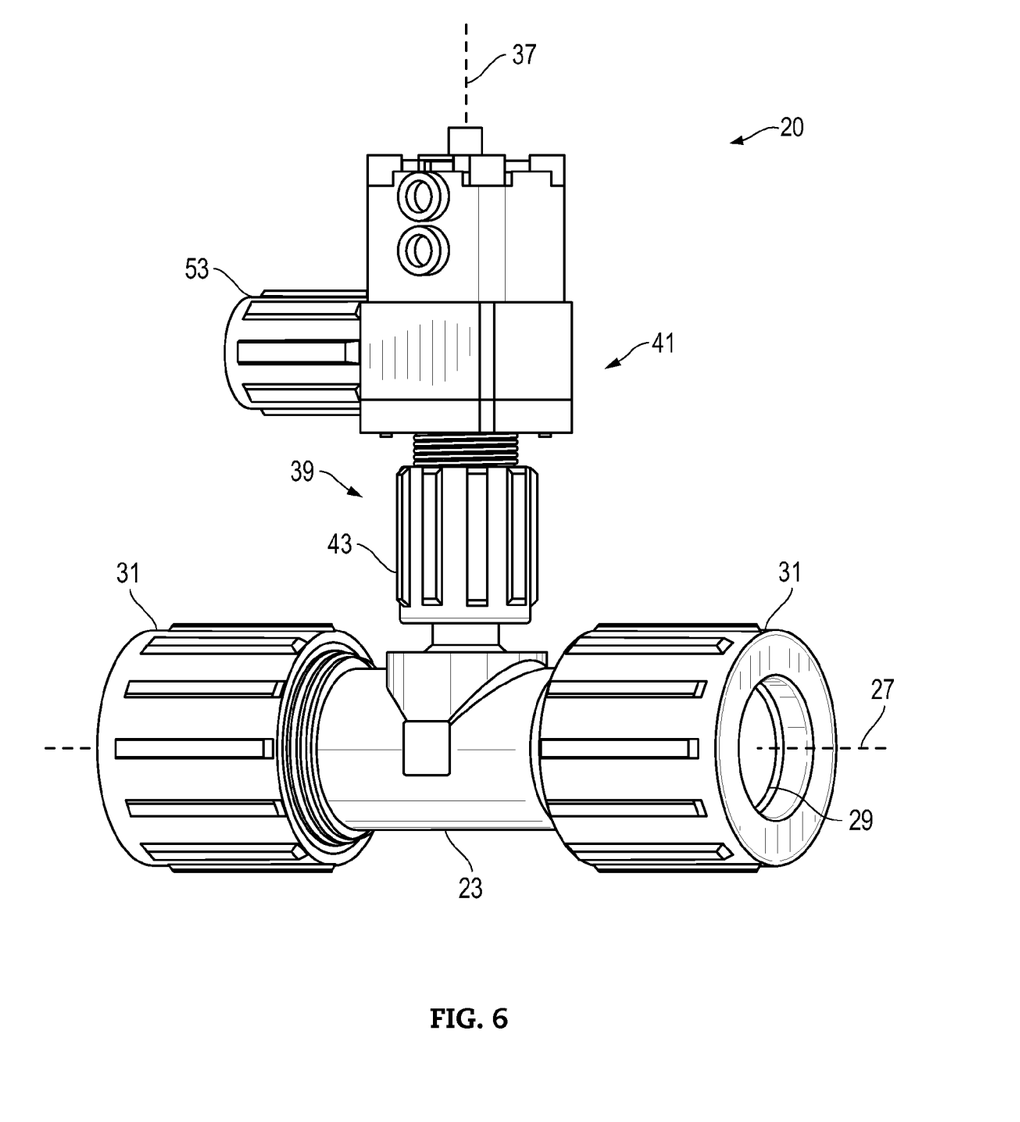
FIG. 6 includes an isometric view a plumbing assembly in accordance with another particular embodiment.
Figure 7:
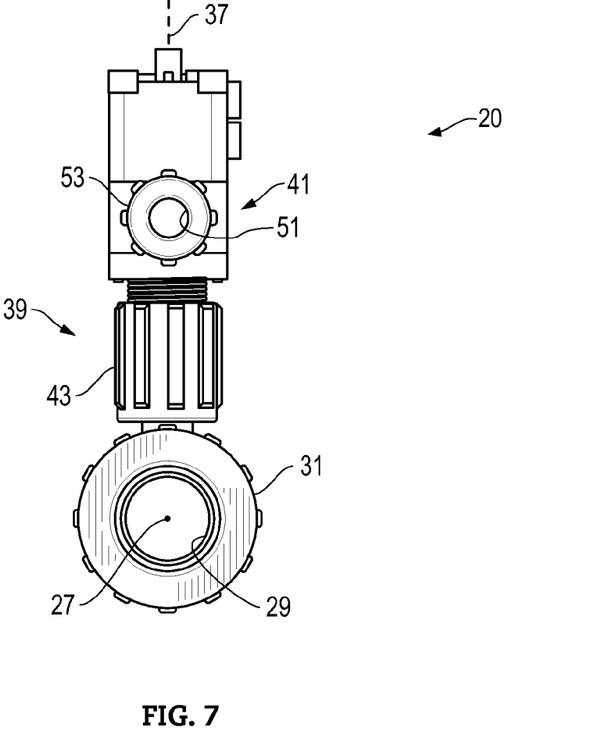
FIG. 7 includes a side plan view of a plumbing assembly in accordance with another particular embodiment.
Figure 8:
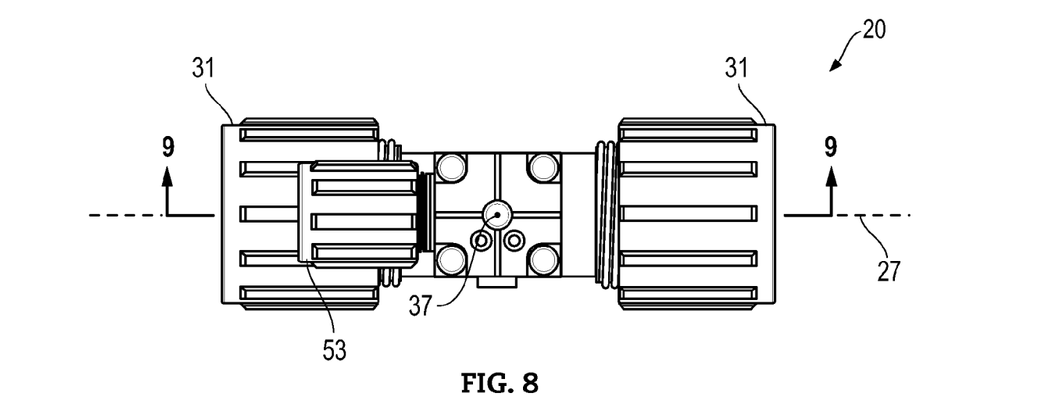
FIG. 8 includes a top plan view of a plumbing assembly in accordance with another particular embodiment.
Figure 9:
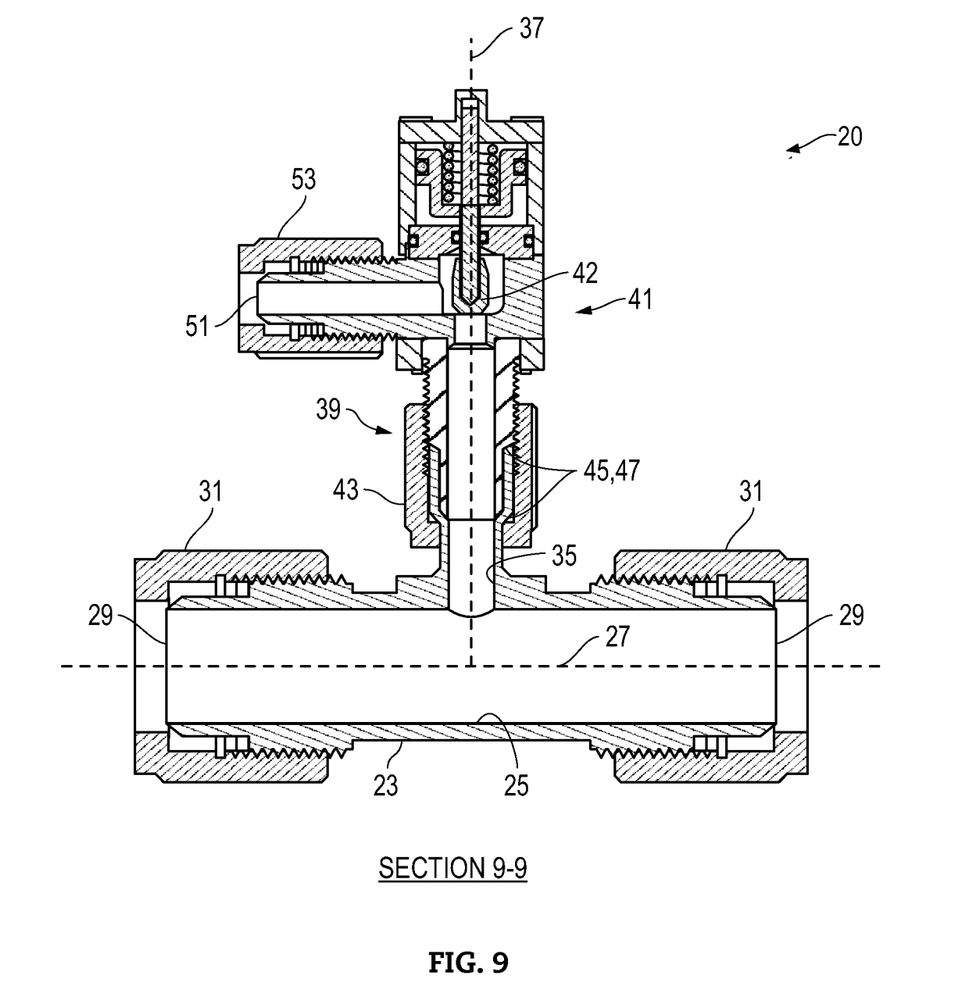
FIG. 9 includes a cross-sectional view of a plumbing assembly in accordance with another particular embodiment taken along line 9-9 in FIG. 8.

As most clearly illustrated in FIG. 5, the main body portion 23 can include a first flared end 26 and a second flared end 28. Each flared end 26, 28 can be chamfered, or formed with a beveled, or flared, face 26', 28'. The beveled faces 26', 28' face are angled from the inner wall of the main bore 25 to the outer wall of the main body portion 23 such that a ramp is formed to facilitate the installation of a tube, or conduit, onto, or around, the first flared end 26 and the second flared end 28.

As indicated in FIG. 5, the main body portion 23 can also include a main bore 25 along the length of the main body portion 23, e.g., from the first flared end 26 of the main body portion 23 to the second flared end 28 of the main body portion 23 along a main axis 27. The main bore 25 can define a first port 29 that is circumscribed by the first flared end 26 of the main body portion 23 and a second port 30 that is circumscribed by the second flared end 28 of the main body portion 23.

The main body portion 23 can include a first threaded portion 26" adjacent to the first flared end 26 of the main body portion 23 and a second threaded portion 28" adjacent to the second flared end 28 of the main body portion 23. Each threaded portion 26", 28" can include an outer diameter, $OD_{TP}$, and each flared end 26, 28 can include an outer diameter, $OD_{FE}$. In a particular aspect, $OD_{FE}$ can be $<OD_{TP}$.

For example, $OD_{FE}$ can be $\leq 95\%$, $OD_{TP}$, $\leq 90\%$ $OD_{TP}$, or $\leq 85\%$ $OD_{TP}$. Further, $OD_{FE}$ can be $\geq 70\%$ $OD_{TP}$, such as $\geq 75\%$ $OD_{TP}$, or $\geq 80\%$ $OD_{TP}$. In another aspect, $OD_{FE}$ can be within a range between and including any of the % $OD_{TP}$ values described herein.

For example, $OD_{FE}$ can be $\leq 95\%$ $OD_{TP}$ and $\geq 70\%$ $OD_{TP}$, $\leq 95\%$ $OD_{TP}$ and $\geq 75\%$ $OD_{TP}$, or $\leq 95\%$ $OD_{TP}$ and $\geq 80\%$ $OD_{TP}$. $OD_{FE}$ can be $\leq 90\%$ $OD_{TP}$ and $\geq 70\%$ $OD_{TP}$, $\leq 90\%$ $OD_{TP}$ and $\geq 75\%$ $OD_{TP}$, or $\leq 90\%$ $OD_{TP}$ and $\geq 80\%$ $OD_{TP}$. $OD_{FE}$ can be $\leq 85\%$ $OD_{TP}$ and $\geq 70\%$ $OD_{TP}$, 85% $OD_{TP}$ and $\geq 75\%$ $OD_{TP}$, or $\leq 85\%$ $OD_{TP}$ and $\geq 80\%$ $OD_{TP}$.

As illustrated, the first threaded portion 26" can be distanced from the first beveled face 26' of the first flared end 26 in order to define, or establish, a first conduit engagement area 26''' around the first flared end 26 of the main body portion 23 between the first beveled face 26' and the first threaded portion 26". The second threaded portion 28" can be distanced from the second beveled face 28' of the second flared end 28 in order to define, or establish, a second conduit engagement area 28''' around the first flared end 28 of the main body portion 23 between the second beveled face 28' and the second threaded portion 28".

Each conduit engagement area 26''', 28''' can have a length, $L_{CEA}$, and each threaded portion can have a length, $L_{TP}$. As illustrated in FIG. 5, $L_{CEA}$, can be $<L_{TP}$. For example, $L_{CEA}$, can be $\leq 95\%$ $L_{TP}$, such as $\leq 90\%$ $L_{TP}$, or $\leq 85\%$ $L_{TP}$. Further, $L_{CEA}$, can be $\geq 70\%$ $L_{TP}$, such as $\geq 75\%$ $L_{TP}$, or $\geq 80\%$ $L_{TP}$. In a particular aspect, $L_{CEA}$ can be within a range between and including any of the % $L_{TP}$ values described herein. For example, $L_{CEA}$ can be $\leq 95\%$ $L_{TP}$ and $\geq 70\%$ $L_{TP}$, such as $\leq 95\%$ $L_{TP}$ and $\geq 75\%$ $L_{TP}$, or $\leq 95\%$ $L_{TP}$ and $\geq 80\%$ $L_{TP}$. Further, $L_{CEA}$ can be $\leq 90\%$ $L_{TP}$ and $\geq 70\%$ $L_{TP}$, such as $\leq 90\%$ $L_{TP}$ and $\geq 75\%$ $L_{TP}$, or $\leq 90\%$ $L_{TP}$ and $\geq 80\%$ $L_{TP}$. Moreover, $L_{CEA}$ can be $\leq 85\%$ $L_{TP}$ and $\geq 70\%$ $L_{TP}$, such as $\leq 85\%$ $L_{TP}$ and $\geq 75\%$ $L_{TP}$, or $\leq 85\%$ $L_{TP}$ and $\geq 80\%$ $L_{TP}$.

FIG. 5 further indicates that a first flare nut 31 can be threadably engaged with the first threaded portion 26" around the first flared end 26 of the main body portion 23. Further, a second flare nut 32 can be threadably engaged with the second threaded portion 28" around the second flared end 28 of the main body portion 23.

In a particular aspect, a first conduit 33, i.e., and end thereof, can be installed around the first flared end 26 of the main body portion 23 at least partially along, or around, the first conduit engagement area 26''' so that the first conduit engagement area 26''' that circumscribes the first flared end 26 extends at least partially into the end of the first conduit 33. The first flare nut 31 can be installed over the first conduit 33 and engaged with the first threaded portion 26". As the first flare nut 31 is tightened onto the first threaded portion 26", the end of the first conduit 33 can be captured between an inner surface of the first flare nut 31 and an outer surface of the first flared end 26 of the main body 24.

Similarly, an end of a second conduit 34 can be installed around the second flared end 28 of the main body portion 23 at least partially along the second conduit engagement area 28''' so that the second conduit engagement area 28''' formed around the second flared end 28 extends at least partially into the end of the second conduit 34. The second flare nut 32 can be installed over the first conduit 34 and engaged with the second threaded portion 28". As the second flare nut 32 is tightened onto the second threaded portion 28", the end of the second conduit 34 can be captured between an inner surface of the second flare nut 32 and an outer surface of the second flared end 28 of the main body 24.

As an alternative to using the flare nuts 31, 32 to connect the conduits 33, 34, the conduits 33, 34 can be permanently attached to the main body 24 of the plumbing fitting 21 by using a fuse bond, a chemical weld, or some other appropriate method of forming a permanent bond or weld.

Returning to FIG. 5, the peripheral body portion 24 of the body 22 of the valve fitting 21 can be formed with a sampling bore 35 that can extend from the main bore 25 formed in the main body portion 23 and the sampling bore 35 can be in fluid communication with the main bore 25. In a particular aspect, the sampling bore 35 can extend along a sampling axis 37 that is substantially perpendicular to the main axis 27. Further, the sampling bore 35 can include a first portion 36 and a second portion 38.

As illustrated, the first portion 36 of the sampling bore 35 can have an inner diameter, $ID_{sb1}$, and the second portion 38 of the sampling bore 35 can have an inner diameter, $ID_{sb2}$. In a particular aspect, $ID_{sb1}$ can be $<ID_{sb2}$ and a flared face 45 can be formed in the inner wall of the peripheral body portion 24 at the interface between the first portion 36 of the sampling bore 35 and the second portion 38 of the sampling bore 35. For example, $ID_{sb1}$ can be $<80\%$ $ID_{sb2}$, such as $<75\%$ $ID_{sb2}$, or $<70\%$ $ID_{sb2}$. Further, $ID_{sb1}$ can be $>50\%$ $ID_{sb2}$, such as $>55\%$ $ID_{sb2}$, or $>60\%$ $ID_{sb2}$.

In another aspect, $ID_{sb1}$ can be with a range between and including any of the % $ID_{sb2}$ values described herein. For example, $ID_{sb1}$ can be $<80\%$ $ID_{sb2}$ and $>50\%$ $ID_{sb2}$, such as $<80\%$ $ID_{sb2}$ and $>55\%$ $ID_{sb2}$, or $<80\%$ $ID_{sb2}$ and $>60\%$ $ID_{sb2}$. In another aspect, $ID_{sb1}$ can be $<75\%$ $ID_{sb2}$ and $>50\%$ $ID_{sb2}$, such as $<75\%$ $ID_{sb2}$ and $>55\%$ $ID_{sb2}$, or $<75\%$ $ID_{sb2}$ and $>60\%$ $ID_{sb2}$. Moreover, $ID_{sb1}$ can be $<70\%$ $ID_{sb2}$ and $>50\%$ $ID_{sb2}$, such as $<70\%$ $ID_{sb2}$ and $>55\%$ $ID_{sb2}$, or $<70\%$ $ID_{sb2}$ and $>60\%$ $ID_{sb2}$.

In another aspect, the main bore 25 of the main body portion 23 can have a substantially uniform inner diameter, $ID_{mb}$, along the length of the main bore 25. Further, in this aspect, $ID_{sb1}$ can be $<ID_{mb}$. For example, $ID_{sb1}$ can be $\leq 40.0\%$ $ID_{mb}$, such as $\leq 37.5\%$ $ID_{mb}$, $\leq 35.0\%$ $ID_{mb}$, or $\leq 30\%$ $ID_{mb}$. Further, $ID_{sb1}$ can be $\geq 15.0\%$ $ID_{mb}$, such as $\geq 20.0\%$ $ID_{mb}$, or $\geq 25.0\%$ $ID_{mb}$.

In another aspect, $ID_{sb1}$ can be within a range between and including any of the % $ID_{mb}$ values described herein. For example, $ID_{sb1}$ can be $\leq 40.0\%$ $ID_{mb}$ and $\geq 15.0\%$ $ID_{mb}$, such as $\leq 40.0\%$ $ID_{mb}$ and $\geq 20.0\%$ $ID_{mb}$, or $\leq 40.0\%$ $ID_{mb}$ and $\geq 25.0\%$ $ID_{mb}$. In another aspect, $ID_{sb1}$ can be $\leq 37.5\%$ $ID_{mb}$ and $\geq 15.0\%$ $ID_{mb}$, such as $\leq 37.5\%$ $ID_{mb}$ and $\geq 20.0\%$ $ID_{mb}$, or $\leq 37.5\%$ $ID_{mb}$ and $\geq 25.0\%$ $ID_{mb}$. Further, $ID_{sb1}$ can be $\leq 35.0\%$ $ID_{mb}$ and $\geq 15.0\%$ $ID_{mb}$, such as $\leq 35.0\%$ $ID_{mb}$ and $\geq 20.0\%$ $ID_{mb}$, or $\leq 35.0\%$ $ID_{mb}$ and $\geq 25.0\%$ $ID_{mb}$. Moreover, $ID_{sb1}$ can be $\leq 30.0\%$ $ID_{mb}$ and $\geq 15.0\%$ $ID_{mb}$, such as $\leq 30.0\%$ $ID_{mb}$ and $\geq 20.0\%$ $ID_{mb}$, or $\leq 30.0\%$ $ID_{mb}$ and $\geq 25.0\%$ $ID_{mb}$.

As indicated in FIG. 5, the peripheral body portion 24 of the body 22 can include a first outer diameter, $OD_{P1}$, measured through the first portion 36 of the sampling bore 35 and a second outer diameter, $OD_{P2}$, measured through the second portion 38 of the sampling bore 35. In a particular aspect, as illustrated in FIG. 5, $OD_{P1}$ can be $<OD_{P2}$. For example, $OD_{P1}$ can be $<85\%$ $OD_{P2}$, such as $<80\%$ $OD_{P2}$, or $<75\%$ $OD_{P2}$. Further, $OD_{P1}$ can be $>60\%$ $OD_{P2}$, such as $>65\%$ $OD_{P2}$, or $>70\%$ $OD_{P2}$.

In another aspect, $OD_{P1}$ can be within a range between and including any of the % $OD_{P2}$ values described herein. For example, $OD_{P1}$ can be $<85\%$ $OD_{P2}$ and $>60\%$ $OD_{P2}$, such as $<85\%$ $OD_{P2}$ and $>65\%$ $OD_{P2}$, or $<85\%$ $OD_{P2}$ and $>70\%$ $OD_{P2}$. In another aspect, $OD_{P1}$ can be $<80\%$ $OD_{P2}$ and $>60\%$ $OD_{P2}$, such as $<80\%$ $OD_{P2}$ and $>65\%$ $OD_{P2}$, or $<80\%$ $OD_{P2}$ and $>70\%$ $OD_{P2}$. Further, $OD_{P1}$ can be $<75\%$ $OD_{P2}$ and $>60\%$ $OD_{P2}$, such as $<75\%$ $OD_{P2}$ and $>65\%$ $OD_{P2}$, or $<75\%$ $OD_{P2}$ and $>70\%$ $OD_{P2}$.

FIG. 5 indicates that the peripheral body portion 24 of the body 22 can include a distal end 46 that can be formed with a flared, or beveled, face 47. Moreover, a third threaded flare nut 39 can be installed around the distal end 46 of the peripheral body portion 24 of the body 22. A sampling valve assembly 41 can be threadably engaged with the third flare nut 39 to engage the sampling valve assembly 41 with the body 22 of the plumbing fitting 21.

Specifically, the sampling valve assembly 41 can include a valve body 60. An inlet tube 61 can extend from the valve body 60. An outlet tube 63 can extend from the valve body 60 substantially perpendicular to the inlet tube 61. The inlet tube 61 can include a first portion 65 that is sized and shaped to fit into the second portion 38 of the sampling bore 35 formed in the peripheral body portion 24 of the body 22 of the plumbing fitting 21. The inlet tube 61 of the sampling valve assembly 41 can also include a threaded second portion 66 adjacent to the first portion 65 of the inlet tube 61 and the threaded second portion 66 can be sized and shaped to threadably engage the third flare nut 39 that is disposed around the peripheral body portion 24 of the body 22 of the plumbing fitting 21.

As shown in FIG. 5, the first portion 65 of the inlet tube 61 can have an outer diameter, $OD_{IT1}$, and the threaded second portion 66 can have an outer diameter, $OD_{IT2}$. In a particular aspect, $OD_{IT1}$ can be $<OD_{IT2}$. For example, $OD_{IT1}$ can be $<85\%\ OD_{IT2}$, such as $<80\%\ OD_{IT2}$, or $<75\%\ OD_{IT2}$. Further, $OD_{IT1}$ can be $>60\%\ OD_{IT2}$, such as $>65\%\ OD_{IT2}$, or $>70\%\ OD_{IT2}$.

In another aspect, $OD_{IT1}$ can be within a range between and including any of the % $OD_{IT2}$ values described herein. For example, $OD_{IT1}$ can be $<85\%\ OD_{IT2}$ and $>60\%\ OD_{IT2}$, such as $<85\%\ OD_{IT2}$ and $>65\%\ OD_{IT2}$, or $<85\%\ OD_{IT2}$ and $>70\%\ OD_{IT2}$. In another aspect, $OD_{IT1}$ can be $<80\%\ OD_{IT2}$ and $>60\%\ OD_{IT2}$, such as $<80\%\ OD_{IT2}$ and $>65\%\ OD_{IT2}$, or $<80\%\ OD_{IT2}$ and $>70\%\ OD_{IT2}$. Further, $OD_{P1}$ can be $>75\%\ OD_{IT2}$ and $>OD_{IT2}$, such as $<75\%\ OD_{IT2}$ and $>65\%\ OD_{IT2}$, or $<75\%\ OD_{P2}$ and $>70\%\ OD_{IT2}$.

As shown in FIG. 5, a flared face 47 can be formed in the outer surface of the inlet tube 61 at the interface between the first portion 65 and the second portion 66 of the inlet tube 61. Further, the inlet tube 61 can include a distal end 67 that can be also formed with a flared face 47.

When the sampling valve assembly 41 is engaged with the plumbing fitting 21, as shown in FIG. 5, the first portion 65 of the inlet tube 61 fits into the body of the sampling valve 42 fits into the second end 38 of the sampling bore 35 of the peripheral body portion 24 of the body 22 of the plumbing fitting 22 and the flared face 47 of the distal end 67 inlet tube 61 can seat against the flared face 45 formed within the sampling bore 35. Moreover, the flared face 47 formed between the first portion 65 and the second portion 66 of the inlet tube 61 can seat against the flared face 45 formed on the distal end 46 of the peripheral body portion 24 of the body 22 of the plumbing fitting 22.

FIG. 5 indicates that the sampling valve assembly 41 can include an internal fluid chamber 70. An inlet bore 75 that can extend along the entire length of the inlet tube 61, through the valve body 60 adjacent to the inlet tube 61, and can terminate at the internal fluid chamber 70 so that the inlet bore 75 is in fluid communication with the internal fluid chamber 70. The inlet bore 75 can have an inner diameter, $ID_I$, and in a particular aspect, $ID_I$ can be the same as $ID_{sb1}$.

The sampling valve assembly 41 can also include an outlet bore 77 formed along the outlet tube 63. The outlet bore 77 extends through the valve body 60 of the sampling valve assembly 41 so that the outlet bore 77 is in fluid communication with the internal fluid chamber 70. The outlet tube 63 can include a distal end 90 that can circumscribe a sampling port 51.

As illustrated, the inlet bore 75 can include a distal end 78 that can terminate at the distal end 67 of the inlet tube 61. The inlet bore 75 can also include a proximal end 79 that can terminate at an inner wall of the valve body 60. The proximal end 79 of the inlet bore 75 can be circumscribed by a valve seat 81. A valve 42 having a stem 82 and a head 83 can be installed within the sampling valve assembly 41 such that the valve 42 is aligned with the inlet bore 75. The head 83 of the valve 42 can be biased toward the valve seat 81, by one or more springs, in order to engage the valve seat 81 and establish a seal with the valve seat 81 in order to block fluid flow through the inlet bore 75. During operation, the valve 42 can move linearly within the sampling valve assembly 41 away from the valve seat 81 so that the head 83 of the valve 42 is unseated, and distanced, from the valve seat 81 to allow fluid flow through the inlet bore 75 and to permit fluid communication between the inlet bore 75, the internal fluid chamber 70, and the outlet bore 77.

Accordingly, when the sampling valve assembly 41 is actuated, or otherwise opened, a sample of fluid moving through the main bore 25 of the main body portion 23 of the body 22 of the plumbing fitting 21 fluid communication is permitted between the plumbing fitting 21 and the sampling valve assembly 41. Further, a sample can flow through the sampling bore 35 of the peripheral body portion 24 of the body 22 of the plumbing fitting 21, through the inlet bore 75 of the sampling valve assembly 41, through the internal fluid chamber 70 of the sampling valve assembly 41, and through the outlet bore 77 of the sampling valve assembly 41.

In a particular aspect, the sampling valve assembly 41 can include, for example, a high pressure valve (HPV) or a compact diaphragm valve (CDV). The sampling valve assembly 41 can include an operating pressure, $P_O$, and $P_O$ can be $\geq 60$ psi, such as $\geq 65$ psi, $\geq 70$ psi, $\geq 75$ psi, or $\geq 80$ psi. Further, $P_O$ can be $\leq 120$ psi, such as $\leq 110$ psi, or $\leq 100$ psi. In a particular aspect, $P_O$ can be within a range between and including any of the values of $P_O$ described herein. For example, $P_O$ can be $\geq 60$ psi and $\leq 120$ psi, such as $\geq 60$ psi and $\leq 110$ psi, or $\geq 60$ psi and $\leq 100$ psi. $P_O$ can be $\geq 65$ psi and $\leq 120$ psi, such as $\geq 65$ psi and $\leq 110$ psi, or $\geq 65$ psi and $\leq 100$ psi. Moreover, $P_O$ can be $\geq 70$ psi and $\leq 120$ psi, such as $\geq 70$ psi and $\leq 110$ psi, or $\geq 70$ psi and $\leq 100$ psi. $P_O$ can be $\geq 75$ psi and $\leq 120$ psi, such as $\geq 75$ psi and $\leq 110$ psi, or $\geq 75$ psi and $\leq 100$ psi. Further, $P_O$ can be $\geq 80$ psi and $\leq 120$ psi, such as $\geq 80$ psi and $\leq 110$ psi, or $\geq 80$ psi and $\leq 100$ psi.

Figure 10:
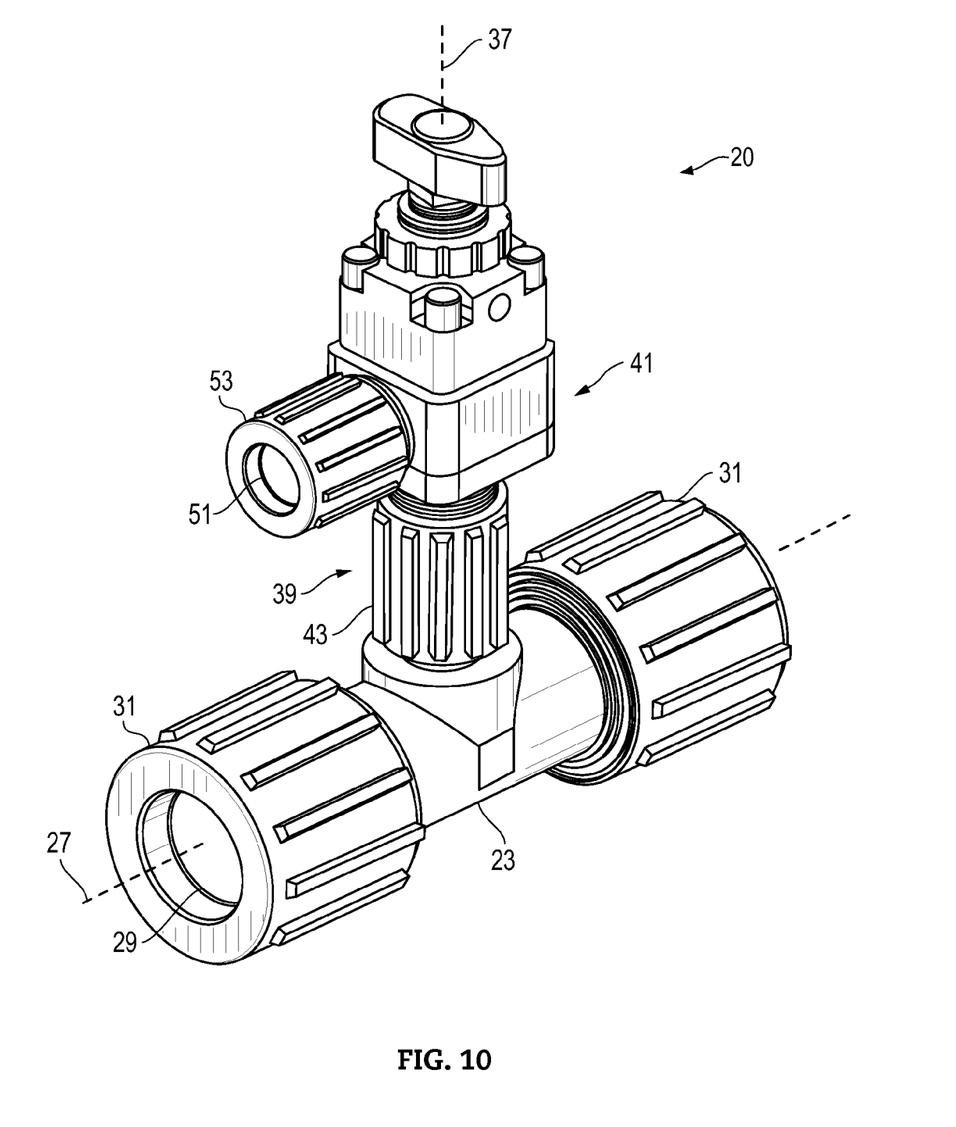
FIG. 10 includes an isometric view a plumbing assembly in accordance with yet another particular embodiment.

The sampling valve assembly can be a pneumatically actuated valve assembly 41 as shown in FIG. 1 through FIG. 5 and FIG. 6 through FIG. 9. Alternatively, the sampling valve assembly can be a manually actuated valve assembly as illustrated in FIG. 10. In either case, a plunger, or valve, can be actuated to release fluid through the sampling valve and out a sampling port 51 circumscribed by a distal end 90 of the outlet tube 62 of the sampling valve assembly 41.

In a particular aspect, the distal end 90 of the outlet tube 63 can be circumscribed by a fourth flare nut 53. The fourth flare nut 53 can be used to connect a third conduit 91 to the plumbing assembly 20.

In another particular aspect, the outlet bore 77 and the sampling port 51 of the outlet bore 77 can have an inner diameter, $ID_O$, and, as described above, the inlet bore 75 can have an inner diameter $ID_I$. In this aspect, $ID_O$ can be $\leq ID_I$. For example, $ID_O$ can be $\leq 70\%\ ID_I$, such as $\leq 65\%\ ID_I$, $\leq 60\%\ ID_I$, or $\leq 50\%\ ID_I$. Further, $ID_O$ can be $\geq 20\%\ ID_I$, such as $\geq 25\%\ ID_I$, or $\geq 30\%\ ID_I$. $ID_O$ can be within a range between and including any of the % $ID_I$ values described herein. For example, $ID_O$ can be $\leq 70\%\ ID_I$ and $\geq 20\%\ ID_I$, such as $\leq 70\%\ ID_I$ and $\geq 25\%\ ID_I$, or $\leq 70\%\ ID_1$ and $\geq 30\%\ ID_I$. $ID_O$ can be $\leq 65\%\ ID_I$ and $\geq 20\%\ ID_I$, such as $\leq 65\%\ ID_I$ and $\geq 25\%\ ID_I$, or $\leq 65\%\ ID_I$ and $\geq 30\%\ ID_1$. In another aspect, $ID_O$ can be $\leq 60\%\ ID_I$ and $\geq 20\%\ ID_I$, such as $\leq 60\%\ ID_I$ and $\geq 25\%\ ID_I$, or $\leq 60\%\ ID_1$ and $\geq 30\%\ ID_I$. Moreover, $ID_O$ can be $\leq 50\%\ ID_I$ and $\geq 20\%\ ID_I$, such as $\leq 50\%\ ID_I$ and $\geq 25\%\ ID_I$ and $\geq 30\%\ ID_1$.

In each of the embodiments shown, no portion of the sampling valve assembly 41, e.g., the inlet tube 61 of the sampling valve assembly 41, extends into the main bore 25 formed in the main body portion 23 of the body 22 of the plumbing fitting 21. As such, the main bore 25 is completely unimpeded. Additionally, use of the sampling valve assembly 41 imparts substantially no pressure drop in fluid flowing through the main bore in the main bore 25 (e.g., between the first port 29 and the second port 30).

In a particular aspect, the fluid flowing through the plumbing fitting 21 can have an operating pressure, P, and the pressure drop, $P_d$, caused by sampling valve can be $\leq 1.0\%$ P, such as $\leq 0.75\%$ P, or $\leq 0.5\%$ P. In another aspect, $P_d$ may be $\geq 0.05\%$ P, $\geq 0.1\%$ P, or $\geq 0.25\%$ P. Further, $P_d$ can be within a range between and including any of the % P values described herein. $P_d$ can be ≤1.0% P and ≥0.05% P, such as ≤1.0% P and ≥0.1% P, or ≤1.0% P and ≥0.25% P. $P_d$ can be ≤0.75% P and ≥0.05% P, such as ≤0.75% P and ≥0.1% P, or ≤0.75% P and ≥0.25% P. Moreover, $P_d$ can be ≤0.5% P and ≥0.05% P, such as ≤0.5% P and ≥0.1% P, or ≤0.5% P and ≥0.25% P.

In a particular aspect, each of the flare nuts 31, 32, 39, and 53 can include external textures 55 (e.g., axial ribs, etc.) to facilitate manual rotation. In some applications, the ribbed nuts may comprise Teflon® PFA materials that interface with a tool to ensure no chemical leakage under flow pressure.

Figure 1:
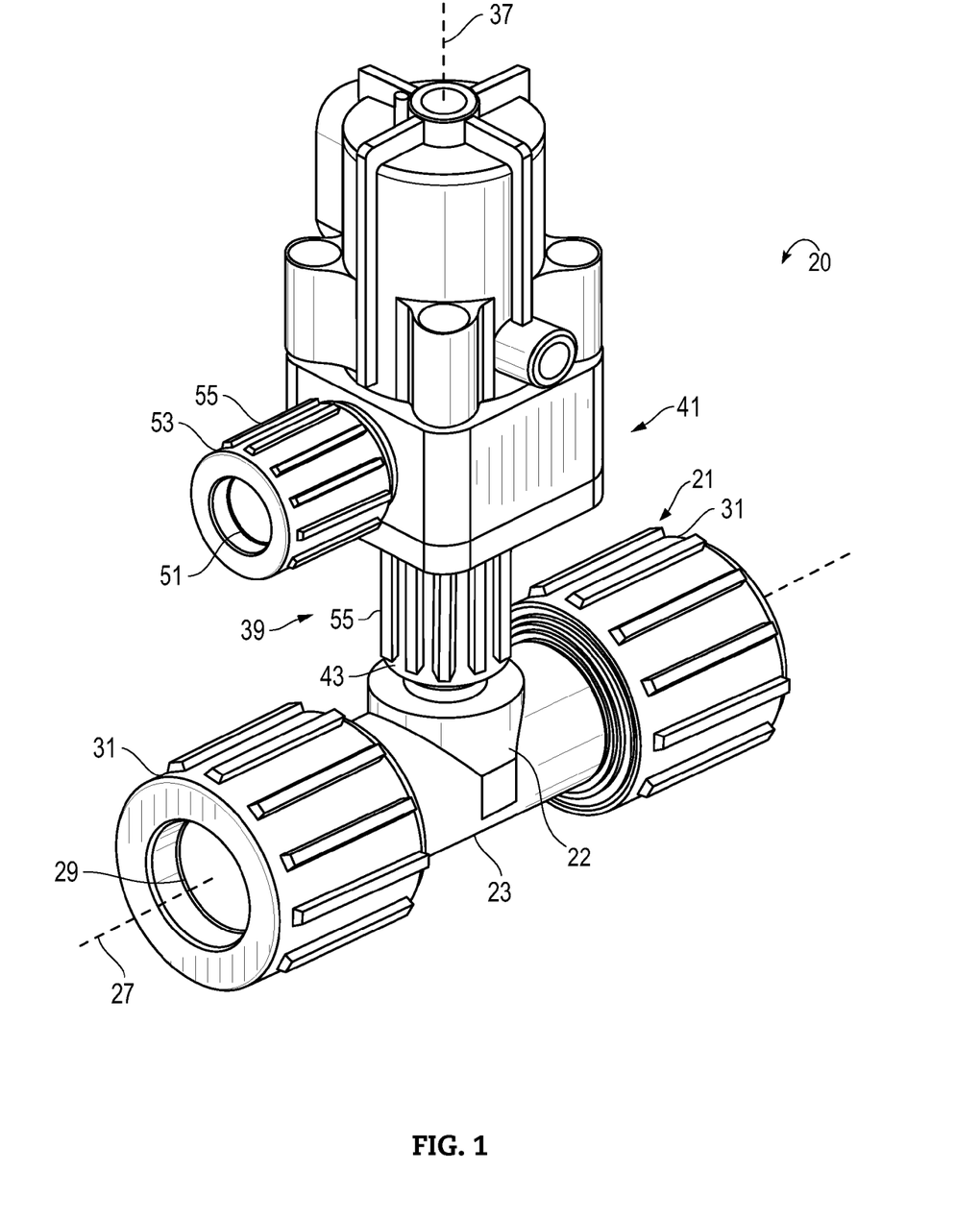
FIG. 1 includes an isometric view of a plumbing assembly in accordance with a particular embodiment.
Figure 2:
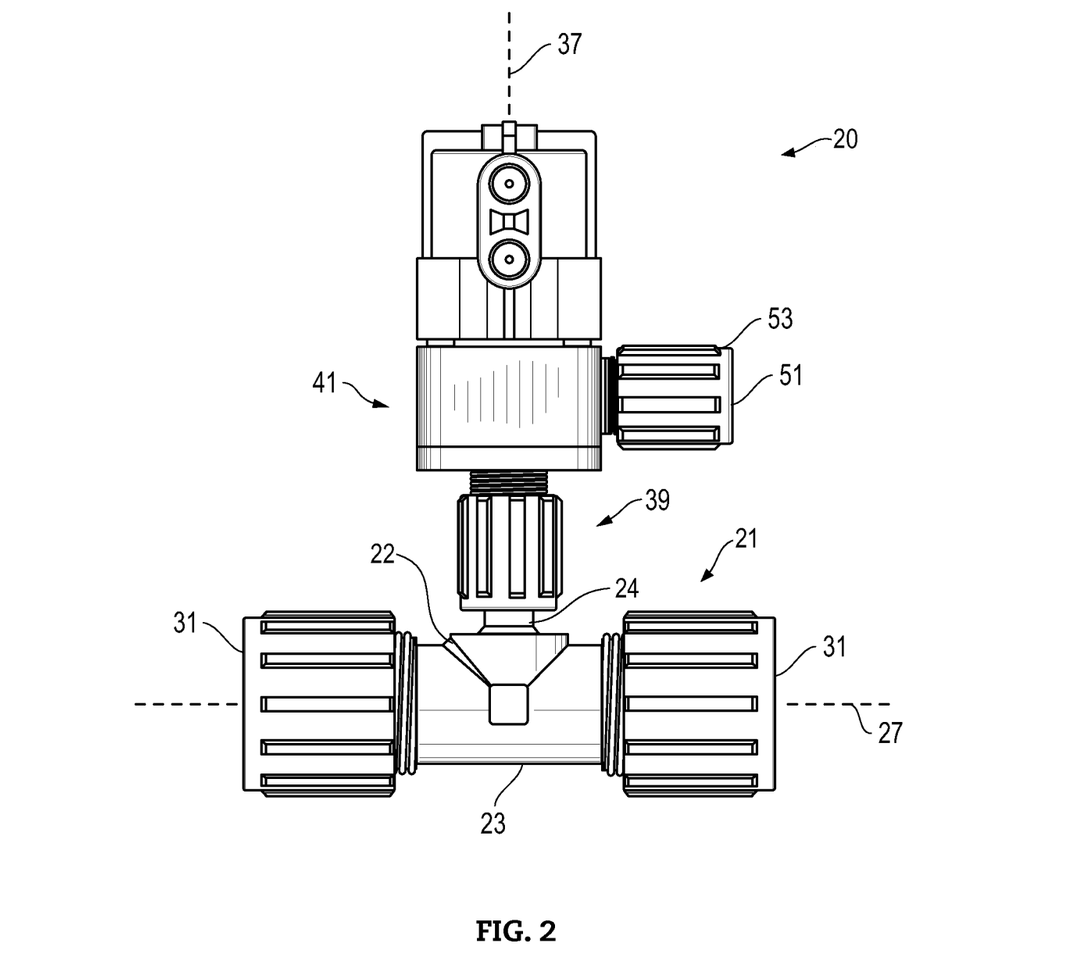
FIG. 2 includes a rear plan view of a plumbing assembly in accordance with a particular embodiment.
Figure 3:
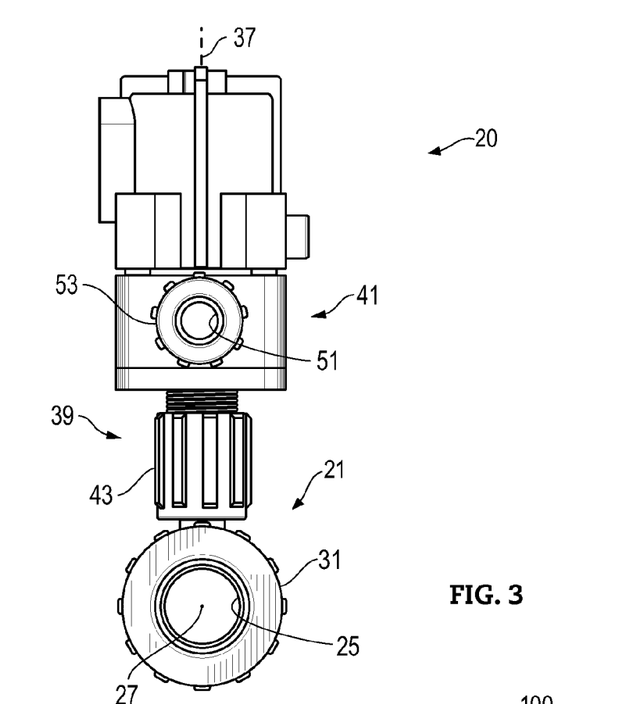
FIG. 3 includes a side plan view of a plumbing assembly in accordance with a particular embodiment.
Figure 4:
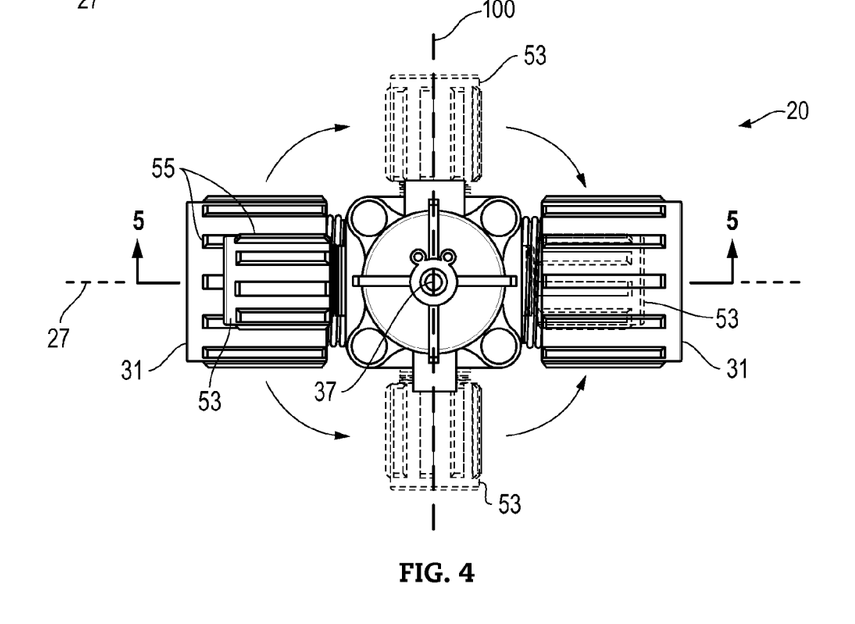
FIG. 4 includes a top plan view of a plumbing assembly in accordance with a particular embodiment.

It can be appreciated that in a particular aspect, while the third flare nut 39 can be threadably engaged with the inlet tube 61 of the valve assembly 41, the third flare nut 39 is free to rotate about the peripheral body portion 24 of the body 22 of the plumbing fitting 21. As such, when the sampling valve assembly 41 is engaged with the plumbing fitting 21, the sampling valve assembly 41 can be rotated about the sampling axis 37 so that an outlet axis 100 extending through the outlet bore 77 and the sampling port 51 can form a sampling angle with respect to the main axis 27. As shown in FIG. 4, the sampling angle can be any angle between and including 0° to 360°.

For example, at 0°, the outlet axis 100 can be parallel to the main axis 27 and the sampling port 51 of the sampling valve 41 can face a first direction that is parallel to the main axis 27. At 180°, the sampling port 51 of the sampling valve 41 can face a second direction that is also parallel to the main axis 27, but opposite the first direction. At 90°, the sampling port 51 of the sampling valve 41 can face a third direction that is perpendicular to the main axis 27. At 270°, the sampling port 51 of the sampling valve 41 can face a fourth direction that is also perpendicular to the main axis 27, but opposite the third direction. Further, as stated above, the outlet port 51 can be rotated at any angle with respect to the main axis 27 in a range between and including 0° to 360°. As such, the sampling valve 41 can be repositioned during use to facilitate sampling.

Figure 11:
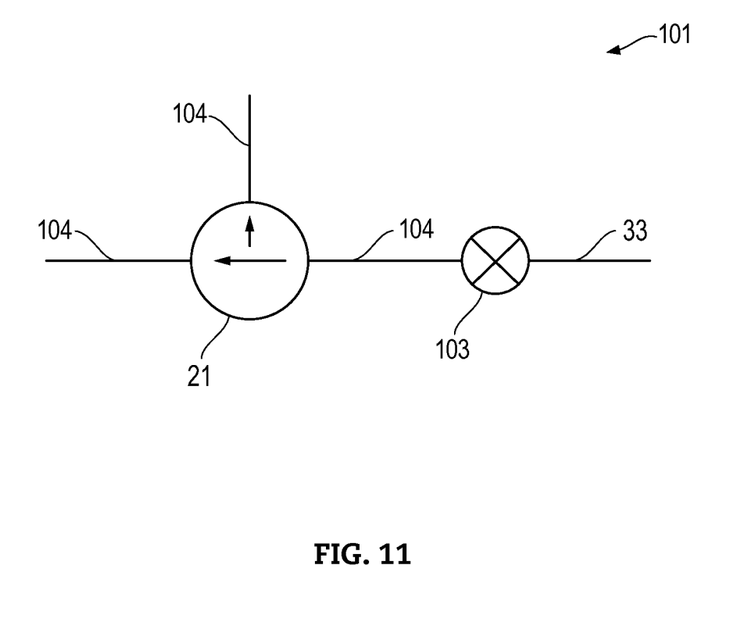
FIG. 11 is a schematic diagram of an embodiment of a plumbing system.

Referring now to FIG. 11, a plumbing system is illustrated and is generally designated 101. As shown in FIG. 11, the plumbing system 101 may comprise a valve (e.g., a shut-off valve) 103, a plumbing fitting 21 having a sampling valve 41 connected thereto, as described herein, a conduit 104 extending from the shut-off valve 103 to the plumbing 21, and from the plumbing fitting 21 downstream thereof. In a particular aspect, closure of the shut-off valve 103 can permit the sampling valve assembly 41 to be removed from the body 22 of the plumbing fitting 21, and replaced by another implement.

The other implement may comprise another sampling valve assembly 41. This configuration also permits purging of the system 101, such as flushing by a fluid like deionized water or nitrogen gas.

However, still other embodiments of implements may comprise at least one of a pressure gage, a static mixer, a thermometer, a velocimeter, a densimeter, and a plug. Each of these implements may be threaded to threadably engage the third flare nut 39 of the plumbing fitting 21 when the sampling valve assembly 41 is removed therefrom. Forms of such implements are known to those of ordinary skill in the art, but they are not interchangeably connectable with a T-shaped plumbing fitting having a readily removable or replaceable sampling valve, as described in detail herein.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A plumbing assembly comprising:
   a plumbing fitting having a body, the body of the plumbing fitting comprising:
   a main body portion comprising a first end and a second end opposite the first end, a main bore extending through the main body from the first end to the second end, a first flare nut around the first end of the main body portion, and a second flare nut around the second end of the main body portion, wherein the first end circumscribes a first port and the second end circumscribes a second port, wherein the first flare nut is configured to connect a first conduit to the first end of the main body, wherein the second flare nut is configured to connect a second conduit to the second end of the main body, and wherein fluid is adapted to flow through the main bore from the first conduit to the second conduit; and a peripheral body portion extending from the main body portion, the peripheral body portion including a distal end having a flared face, a third flare nut circumscribing the distal end of the peripheral body portion, and a sampling bore extending through the peripheral body such that the sampling bore is in fluid communication with the main bore; and a sampling valve threadably coupled to the peripheral body portion of the plumbing fitting and extending axially into the sampling bore past the flared face of the peripheral body portion without extending into the main bore such that the main bore is unimpeded by the sampling valve, wherein use of the sampling valve to sample fluid can occur while fluid flows along the main bore from the first conduit to the second conduit without imparting a pressure drop, $P_D$, of greater than 1% of an operating pressure, P, of the fluid flowing through the main bore between the first and second conduits.

2. The plumbing assembly according to claim 1, wherein the sampling valve is a high pressure valve (HPV) or a compact diaphragm valve (CDV).

3. The plumbing assembly according to claim 1, wherein the sampling valve comprises a pneumatically actuated valve assembly further comprising:
a valve having a stem and a head,
wherein during operation the valve moves linearly to selectively permit fluid flow through the sampling valve.

4. The plumbing assembly according to claim 1, wherein the sampling valve is operably engageable with the peripheral body portion at any rotational angle relative to an axis of the main bore.

5. The plumbing assembly according to claim 1, wherein the sampling valve is adapted to permit fluid sampling through the sampling valve upon opening of a single valve.

6. The plumbing assembly according to claim 1, wherein the distal end of the peripheral body portion includes a flared face, and wherein the flared face is adapted to seat against the sampling valve.

7. The plumbing assembly according to claim 1, wherein the sampling bore has a first portion having an inner diameter, $ID_{sb1}$, and the main bore has an inner diameter, $ID_{mb}$, and wherein $ID_{sb1} < ID_{mb}$.

8. The plumbing assembly according to claim 7, wherein $ID_{sb1} \leq 40.0\% \ ID_{mb}$.

9. The plumbing assembly according to claim 1, wherein the sampling valve comprises an inlet tube having a first portion and a threaded second portion adjacent to the first portion, wherein the first portion of the inlet tube extends into the second portion of the sampling bore and the third flare nut threadably engages the threaded second portion of the inlet tube to secure the sampling valve to the plumbing fitting.

10. The plumbing assembly according to claim 9, wherein the peripheral body portion includes a flared face within the sampling bore between the first portion and second portion of the sampling bore, and the inlet tube of the sampling valve includes a distal end formed with a flared face that is configured to engage and seat against the flared face within the sampling bore.

11. The plumbing assembly according to claim 1, where each of the flare nuts have external textures to facilitate manual rotation.

12. The plumbing assembly according to claim 1, further comprising at least one of a pressure gage, a static mixer, a thermometer, a velocimeter, a densimeter, and a plug, each of which is threaded to threadably engage the third flare nut when the sampling valve is removed therefrom.

13. The plumbing assembly according to claim 1, wherein the sampling valve further comprises a fourth flare nut that circumscribes a distal end of the outlet tube.

14. The plumbing assembly according to claim 1, wherein the sampling valve further comprises:
an inlet tube; and
an outlet bore,
wherein the outlet bore and the sampling port have an inner diameter, $ID_O$, and the inlet tube includes an inlet bore having a diameter, $ID_I$, wherein $ID_O \leq ID_I$.

15. The plumbing assembly according to claim 14, wherein $ID_O \leq 70\% \ ID_I$.

16. The plumbing assembly according to claim 1, wherein the sampling valve is rotatably connected to the peripheral body portion of the body of the plumbing fitting, such that the sampling valve can be rotated about a sampling axis extending through the sampling bore.

17. A plumbing system, comprising:
a plumbing fitting having a body, the body comprising:
a main body portion comprising a first end and a second end opposite the first end, a main bore extending through the main body from the first end to the second end, a first flare nut around the first end of the main body portion, and a second flare nut around the second end of the main body portion, wherein the first end circumscribes a first port and the second end circumscribes a second port, wherein the first flare nut is configured to connect a first conduit to the first end of the main body, and wherein the second flare nut is configured to connect a second conduit to the second end of the main body, and wherein fluid is adapted to flow through the main bore from the first port to the second port; and
a peripheral body portion extending from the main body portion, the peripheral body portion including a distal end having a flared face, a third flare nut circumscribing the distal end of the peripheral body portion, and a sampling bore extending through the peripheral body such that the sampling bore is in fluid communication with the main bore;
a sampling valve threadably coupled to the peripheral body portion of the plumbing fitting and axially into the sampling bore past the flared face of the peripheral body portion without extending into the main bore, such that the main bore is unimpeded by the sampling valve and use of the sampling valve imparts a pressure drop, $P_D$, in fluid flowing through the main bore between the first port to the second port that is no greater than 1% of an operating pressure, P, of the fluid flowing through the main bore between the first and second ports; and
a shut-off valve coupled to the plumbing fitting upstream from the plumbing fitting via a conduit, wherein closure of the shut-off valve permits the sampling valve to be removed from the plumbing fitting, and replaced by another implement.

18. The plumbing system according to claim 17, wherein the sampling valve comprises a pneumatically actuated valve assembly, and wherein during operation the valve moves linearly to selectively permit fluid flow through the sampling valve.

19. The plumbing system according to claim 17, wherein the other implement comprises another sampling valve or a pressure gage, static mixer, thermometer, velocimeter, densimeter and plug, each of which is threaded to threadably engage the threaded port of the sampling bore when the sampling valve is removed therefrom.

20. A plumbing assembly comprising:
- a plumbing fitting having a body, the body of the plumbing fitting comprising:
  - a main body portion comprising a first end and a second end opposite the first end, a main bore extending through the main body from the first end to the second end, wherein the first end circumscribes a first port and the second end circumscribes a second port, wherein fluid is adapted to flow through the main bore from the first port to the second port; and
  - a peripheral body portion extending from the main body portion, the peripheral body portion including a distal end having a flared face, and a sampling bore extending through the peripheral body such that the sampling bore is in fluid communication with the main bore; and
- a sampling valve threadably coupled to the peripheral body portion of the plumbing fitting and extending axially into the sampling bore past the flared face of the peripheral body portion without extending into the main bore such that the main bore is unimpeded by the sampling valve and use of the sampling valve imparts a pressure drop, $P_D$, in fluid flowing through the main bore between the first port to the second port that is no greater than 1% of an operating pressure, P, of the fluid flowing through the main bore between the first and second ports.

* * * * *